US007804609B2

(12) United States Patent
Voskuil

(10) Patent No.: US 7,804,609 B2
(45) Date of Patent: Sep. 28, 2010

(54) METHODS AND SYSTEMS TO CONNECT NETWORK PRINTERS

(75) Inventor: Eric K. Voskuil, Somersworth, NH (US)

(73) Assignee: Desktop Standard Corporation, Portsmouth, NH (US)

( * ) Notice: Subject to any disclaimer, the term of this patent is extended or adjusted under 35 U.S.C. 154(b) by 1175 days.

(21) Appl. No.: 10/983,463

(22) Filed: Nov. 8, 2004

(65) Prior Publication Data

US 2005/0134904 A1 Jun. 23, 2005

Related U.S. Application Data

(60) Provisional application No. 60/518,176, filed on Nov. 7, 2003, provisional application No. 60/518,152, filed on Nov. 7, 2003, provisional application No. 60/573,482, filed on May 21, 2004.

(51) Int. Cl.
*G06F 3/12* (2006.01)
*G06F 3/00* (2006.01)
(52) U.S. Cl. ............... 358/1.15; 710/8; 710/9; 710/16; 719/321; 717/177; 717/178
(58) Field of Classification Search ............... 358/1.15; 710/8, 9, 16, 223
See application file for complete search history.

(56) References Cited

U.S. PATENT DOCUMENTS

| 5,581,764 | A | 12/1996 | Fitzgerald et al. |
| 5,692,111 | A * | 11/1997 | Marbry et al. ............. 358/1.15 |
| 6,199,204 | B1 | 3/2001 | Donohue |
| 6,202,207 | B1 | 3/2001 | Donohue |
| 6,209,128 | B1 | 3/2001 | Gerard et al. |
| 6,345,386 | B1 | 2/2002 | Delo et al. |
| 6,418,554 | B1 | 7/2002 | Delo et al. |
| 6,466,932 | B1 | 10/2002 | Dennis et al. |
| 6,523,166 | B1 | 2/2003 | Mishra et al. |
| 6,836,794 | B1 | 12/2004 | Lucovsky et al. |
| 6,952,831 | B1 * | 10/2005 | Moore ........................ 719/327 |

(Continued)

OTHER PUBLICATIONS

Bodnar, David, et al., "Windows 2000 Deployment Overview at the University of Colorado at Boulder," 2000, ACM, pp. 8-13.

(Continued)

*Primary Examiner*—Mark K Zimmerman
*Assistant Examiner*—Huo Long Chen
(74) *Attorney, Agent, or Firm*—Senniger Powers LLP

(57) ABSTRACT

Methods and systems of automatically configuring network printer connections are disclosed. A network printer with a network location is coupled to a network, which also includes one or more target computers. A driver is associated with the network printer, and is located in a provided by a share-providing computer on the network. Through the network, the target computer receives configuration signals that identify the share and the network location of the network printer. The target computer sends through the network a command that results in the share sending driver-identification signals that identify a driver. A network printer connection is then established at the target computer where the connection's printer is the network printer at the location identified by the configuration signals and the connection's driver is the driver identified by the driver-identification signals.

25 Claims, 1 Drawing Sheet

U.S. PATENT DOCUMENTS

| | | | |
|---|---|---|---|
| 6,996,818 B2 | 2/2006 | Jacobi et al. | |
| 7,231,435 B2* | 6/2007 | Ohta | 709/221 |
| 7,253,915 B2* | 8/2007 | Kemp et al. | 358/1.15 |
| 2002/0083431 A1* | 6/2002 | Machida | 717/174 |
| 2002/0178249 A1 | 11/2002 | Prabakaran et al. | |
| 2004/0034862 A1* | 2/2004 | Kadota | 719/321 |
| 2006/0031226 A1 | 2/2006 | Cope et al. | |
| 2006/0265708 A1 | 11/2006 | Blanding et al. | |
| 2007/0220068 A1 | 9/2007 | Thompson et al. | |

OTHER PUBLICATIONS

Judy, Brad, et al., "Windows 2000 Deployment Technical Challenges at the University of Colorado at Boulder," 2000, ACM, p. 141-145.

Nguyen, Douglas N., et al., "NT/Windows 2000 User Profile Issues," 2001, ACM, p. 120-122.

Author Unknown, GPOVault Enterprise, desktopstandard, 1997-2006, 2 pages, DesktopStandard Corporation, USA.

Author Unknown, GPOVault, desktopstandard, 2005, 2 pages, DesktopStandard Corporation, USA.

* cited by examiner

METHODS AND SYSTEMS TO CONNECT NETWORK PRINTERS

CROSS-REFERENCE TO RELATED APPLICATIONS

The present application claims the benefit of the following U.S. Provisional Patent Applications: Ser. No. 60/518,176, which was filed on Nov. 7, 2003, by Eric K. Voskuil for Methods and Systems to Connect Network Printers; Ser. No. 60/518,152, which was filed on Nov. 7, 2003, by Eric K. Voskuil for Methods and Systems to Connect Network Printers; and Ser. No. 60/573,482, which was filed on May 21, 2004, by Eric Voskuil for Systems and Methods for Policy-Based Management; are all hereby incorporated by reference.

BACKGROUND OF THE INVENTION

1. Field of the Invention

The disclosed methods and systems relate generally to connections between computers and printers, and more particularly to automatically establishing connections between computers and network printers.

2. Background Information

At least two types of printer connections that may be made to a computer connected to a network are known in the art: (i) a local printer connection, and (ii) a network printer connection. Each connection requires that there be a communications path between the computer and the printer, and that the driver associated with the printer be installed on the computer.

Three types of printers may be recognized: local printers, network printers, and shared printers. A local printer may be understood to be a printer that is connected directly to a physical port (such as, but not limited to a serial port, parallel port, USB port, or other port) on a computer (referred to herein as a "local computer"). A dedicated wire or wireless communications path connects the local computer, via the physical port, to the local printer. Additionally, the driver/drivers associated with the local printer must be present on the local computer. The driver/drivers may be but are not limited to computer software installed on a computer to enable the computer to use a specific type or types of printer, in this case the local printer. When the operating system of the local computer receives a print command, it knows how to internally process that command and the data to be printed. Thus, the operating system sends the command and the data to be printed to the physical port for transmission to the local printer. Before the command is internally processed and sent to the local printer, the driver configures the print command and the data so that the local printer is able to understand the command and the data, and thus the local printer is able to print the data after it and the print command are received from the local computer.

If a local printer is "shared" from the local computer to which it is connected, such that other computers with a communications path to the local computer may use the printer, the printer may be known as a shared printer, or a shared local printer, and the local computer may itself be referred to as a print server or a proxy. For a computer to use the shared printer connection, the operating system of that computer must be able to communicate with the operating system of the local computer. Thus, after the driver processes the print command and the data, but before the print command is sent over the communications path to the local computer, it must first pass through an operating system-specific protocol stack. This protocol stack further formats the command and the data so that when the operating system of the local computer receives these from its interface with the communications path, it is able to interpret the command and the data and internally process them so that they are communicated over the local printer connection to the local printer. Without this additional layer of formatting, the local computer would not know how to internally process the print command and the data so that it was communicated to the local printer via the local printer connection.

Thus, a shared printer may be considered a local printer that is accessed indirectly though a local computer and may be understood to be a printer that is locally connected to the local computer, with that local printer connection "shared" from the local computer with other computers on a network. Shared printers may thus be accessed and used from computers on a network other than the local computer to which the shared printer is locally connected.

When a local printer connection is shared, the operating system on the local computer creates a share for the driver/drivers associated with the local printer. A share is a logical construct or object that exposes a resource (such as the driver/drivers associated with the local printer, or the local printer itself) to other computers in network communication with the local computer. Upon creation of the share, both the local printer and the driver/drivers associated with it are then available to be accessed by any other computer or device on the network. The location of a share is typically defined by a path to the computer that provides the share. The path is described according to the hierarchy of the network, and for a driver in a share typically includes the name of the computer that provides the share and the name of the driver file itself.

In contrast to a shared printer, a network printer resides on the computer network, may be directly accessed by any computer connected to the network, and such access does not require the existence of a local computer connected to the printer acting as a print server. Thus, because the local computer is not present, unlike what occurs with a shared printer connection, the print command and the data to be printed do not pass through the operating system-specific protocol stack before being communicated over the network to the network printer. The other steps in the process (i.e., the print command and the data being formatted by the driver for the network printer, and these being transmitted over the network to the network printer according to the network's protocol) remain the same. Thus, the additional layer of processing overhead present in a shared printer connection, so that the computer generating the print command is able to communicate with the local computer that is sharing its local printer connection, is not necessary.

In managed computer networks, it is often important to automate configuration of connections between computers on the network and shared and/or network printers. The connection of shared printers to a computer or computers on the network may be facilitated by an operating system (e.g., any of the Windows® brand of operation systems) that may include a feature or set of functions or instructions that allow for automatically configuring the connection. This automatic configuration may be initiated manually (such as by selecting options within the printer configuration menu in the Windows® Control Panel) or programmatically (such as by calling/executing an instruction or set of instructions, for example but not limited to, routines provided by a Windows®-specific Application Programming Interface (API) that create the connection). Administration products commonly utilize a shared printer connection API to connect printers to one or more computers. This prevents the end-user of each computer, or the administrator of the network, from having to manually establish the connection to the shared printer from each network computer. Shared printers, via the local computer to which they are connected, thus share their printer connection and printer drivers, as described above. Accordingly, a complicated part of configuring the connection between a computer and a shared printer is automatically handled by the shared printer connection API, as it transfers the shared printer's drivers from the share-providing computer to the other computer(s) that will use the shared printer via the shared printer connection.

Network printers typically offer much better performance than shared printers, as a network printer connection is more robust and requires less processing overhead than a shared printer connection. Thus, network printer connections are widely used in corporate networks. However, establishing network printer connections between network printers and computers on the network is generally significantly different from establishing shared printer connections. When establishing shared printer connections, preexisting APIs may use the parameters of the already-existing local printer connection, including the location of the driver in the share, to configure the shared printer connections. However, when establishing network printer connections, because network printers do not have a local printer connection to a local computer, and thus no already-existing share for the printer and its driver/drivers, network printers typically lack the facility and/or capability for transferring and/or sharing their drivers with other devices on the network, which shared printer connections are able to do easily, as described above.

Thus, a user may be required to perform a software installation process (e.g., but not limited to, running a setup program, designed for the particular printer, from a readable medium such as a compact disk, floppy disk, etc.) on each computer. This process is complicated for end-users, and introduces an additional management burden even if performed by network administrators. Thus, the easy steps described above used to manually establish and configure a shared printer connection may not work. Additionally, to automate the process of establishing network printer connections without having a pre-existing API/APIs or its equivalent(s) may become very complicated. Therefore, a great deal of time and effort is required for end-users or network administrators to establish and configure network printer connections.

SUMMARY OF THE INVENTION

In an embodiment of the invention there is provided a method of automatically configuring a target computer on a network to have a connection to a network printer. The target computer receives, through the network, configuration signals that identify a share-providing computer on the network and a network location of the network printer on the network. The share-providing computer provides a share that specifies a driver associated with the network printer. A command is sent from the target computer through the network that results in the share's sending, to the target computer, driver-identification signals that identify a driver. A network-printer connection is established at the target computer, where the connection's network printer is the network printer at the location identified by the configuration signals, and where the connection's driver is the driver identified by the driver-identification signals.

In a related embodiment, the method may also include employing the target computer to make a determination of whether the target computer includes the driver identified by the driver-identification signals, and then obtain the driver through the network if the determination is that the target computer does not include that driver. Further, the target computer may obtain the driver from the share.

In another related embodiment, the configuration signals may identify the network location of the network printer in terms of the network printer's network address. In yet another related embodiment, the configuration signals that identify the share may specify a path to the share.

In still another related embodiment, calls to an applications-programming interface provided by the target computer's operating system may be employed to send the command and establish the network-printer connection. In yet still another related embodiment, the driver-identification signals may provide the driver's name.

In another embodiment, there is provided a system that includes a network and a share-providing computer, a target computer, a network printer, and a server, all operatively coupled to the network. The share-providing computer provides a share that includes a driver associated with the network printer. The server contains configuration information that identifies the share-providing computer and the network printer's network location. The target computer contains a set of instructions that, when executed by the target computer, cause the target computer to retrieve the configuration information from the server, send to the share's network location identified by the configuration information thereby retrieved a command that results in the share's sending, to the target computer, driver-identification signals that identify the driver, and establish at the target computer a network-printer connection whose network printer is the network printer at the location identified by the configuration information retrieved from the server and whose driver is the driver identified by the driver-identification signals sent from the share.

In a related embodiment, the set of instructions may further include making a determination of whether the target computer includes the driver identified by the driver-identification signal, and obtaining the driver through the network if the determination is that the target computer does not include that driver. Further, the target computer may obtain the driver from the share.

In another related embodiment, the set of instructions may include an applications-programming interface provided by the target computer's operating system. Further, calls to an applications-programming interface provided by the target computer's operating system may be employed to send the command and establish the network-printer connection.

In yet another related embodiment, the configuration information may identify the network location of the network printer in terms of the network printer's network address. In still another related embodiment, the configuration information that identifies the share may specify a path to the share. In yet still another related embodiment, the set of instructions may include routines exposed by an applications-programming interface provided by the target computer's operating system. In still yet another related embodiment, calls to an applications-programming interface provided by the target computer's operating system may be employed to send the command and establish the network-printer connection. In even still another related embodiment, the driver-identification signals include signals that provide the driver's name.

In another embodiment, there is provided a target computer system operatively coupled to a network. The target computer system is configured by programming to receive, through the network, configuration signals that identify (i) a share-providing computer on the network, the share-providing computer providing a share that specifies a driver associated with a network printer, and (ii) the network printer's network location; send through the network a command that results in the share sending to the target computer driver-identification signals that identify a driver; and establish at the target computer a network printer connection whose network printer is the network printer at the location identified by the configuration signals and whose driver is the driver identified by the signals sent from the share.

In a related embodiment, the target computer system may also contain an operating system that exposes applications programming interface routines for sending through a network a command that results in a share sending the driver-identification signals to the target computer and for establishing a network-computer connection on the target computer; and the target computer may be configured to employ those applications programming interface routines to send the command to the share identified by the configuration signals and to establish the network printer connection with the network printer at the location identified by the configurations signals. Additionally, the target computer system may further be configured by programming to detect a triggering event. Further, the applications programming interface routines may not be exposed until after a triggering event is detected. Further, the triggering event may be the execution of a logon script at the target computer.

In another related embodiment, the target computer system may further be configured by programming to make a determination of whether the target computer includes the driver identified by the driver-identification signals, and then obtain the driver through the network if the determination is that the target computer does not include that driver. Further, the target computer may obtain the driver from the share.

In still another related embodiment, the network location of the network printer may be a network address. In yet still another related embodiment, the driver-identification signals may include signals that provide the driver's name.

BRIEF DESCRIPTION OF THE DRAWINGS

The invention description below refers to the accompanying drawings, of which.

Figure 1:
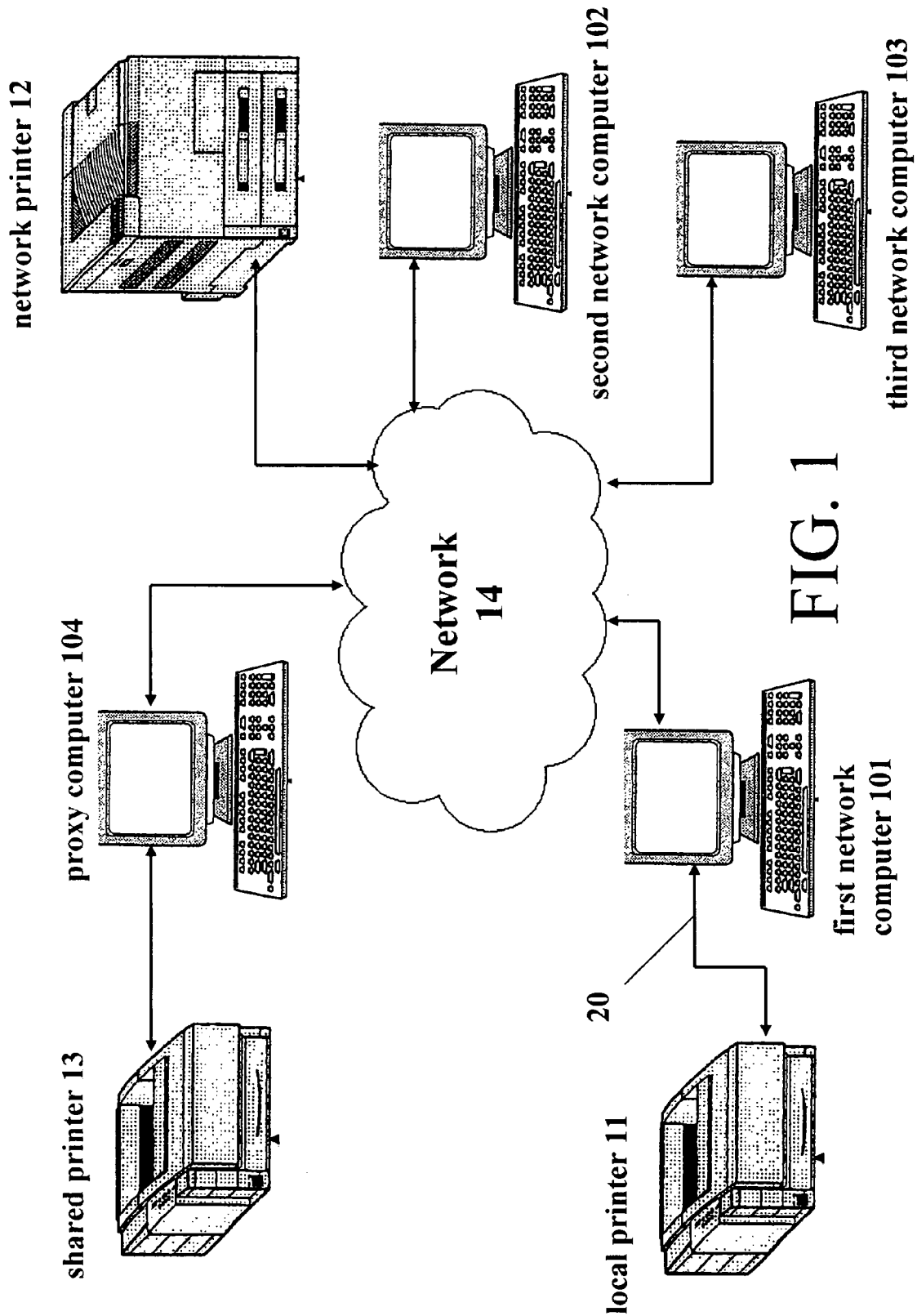
FIG. 1 is a network of computers and printers that includes a local printer connection, a shared printer connection, and a network printer connection.

DETAILED DESCRIPTION OF AN
ILLUSTRATIVE EMBODIMENT

To provide an overall understanding, certain illustrative embodiments will now be described; however, it will be understood by one of ordinary skill in the art that the systems and methods described herein may be adapted and modified to provide systems and methods for other suitable applications and that other additions and modifications may be made without departing from the scope of the systems and methods described herein.

Unless otherwise specified, the illustrated embodiments may be understood as providing exemplary features of varying detail of certain embodiments, and therefore, unless otherwise specified, features, components, modules, and/or aspects of the illustrations may be otherwise combined, separated, interchanged, and/or rearranged without departing from the disclosed systems or methods. Additionally, the shapes and sizes of components are also exemplary and unless otherwise specified, may be altered without affecting the scope of the disclosed and exemplary systems or methods of the present disclosure.

FIG. 1 shows elements both according to the prior art and the current invention. In FIG. 1, a number of target computers are connected to a network 14. A local connection may be established, as described above, between a first network computer 101 and a local printer 11. This connection may be made through any type of communications path, such as but not limited to a cable 20 attached from the local printer 11 to a physical hardware port (not shown) on the first network computer 101. The cable/port combination may be, but is not limited to, a parallel connection cable attached from the local printer 11 to a parallel port on the first network computer 101. Of course, other types of communications paths using a cable/port combination, such as a serial cable attached to a serial port, or a universal serial bus ("USB") cable attached to a USB port, and so on, may be used; and paths not incorporating a cable/port combination, such as wireless communications paths, may also be used.

In FIG. 1, a local printer connection may also be established between a shared printer 13 and a proxy computer 104, as described above, such that the proxy computer 104 is the local computer for the local printer connection. The local printer connection between the shared printer 13 and the proxy computer 104 may then be "shared" with one or more other target computers that do not have a local printer connection to the shared printer 13, but are rather connected to the proxy computer 104 by, for example but not limited to, the network 14. In such an arrangement, the proxy computer 104 to which the shared printer 13 is locally connected acts as a proxy or print server for the shared printer 13. Further, a share specifying the driver or drivers associated with the shared printer 13 is established at the proxy computer 104. Any of the target computers or any other device on the network 14 may access the share through the proxy computer 104, which is a share-providing computer that contains the share. The share may specify the driver or drivers by, for example, the driver's name.

A connection involving a network printer 12 may also be present in the system shown in FIG. 1. The network printer 12 resides on the network 14 and has a network location associated with it. This network location may be but is not limited to a network address such as an Internet Protocol ("IP") address. The network location may be associated with the network printer 12 in at least two different ways. First, the network printer 12 may include a network interface (not shown) that is built into the network printer 12. The network interface may include, for example, but is not limited to a network interface card. The network interface allows the network printer 12 to be connected to the network 14 by any type of wired or wireless connection, for example but not limited to an Ethernet cable. Second, the network printer 12 may be connected to another device (not shown) that itself has a network interface. This device may be, for example, but is not limited to a server whose function is to provide a communications path between the network printer 12 and the network 14. This communications path does not require the print command and the data to be printed to pass through an operating system-specific protocol stack before being sent from a target computer on the network 14 to the device. Thus, the device may function as a switch, creating a path from its network interface to the network printer 12. In this situation, the network location of the network printer 12 is the location associated with the device.

An illustrative embodiment of the invention enables automatic configuration of network printer connections between the network printer 12 and any number of target computers, all of which are operatively coupled to the network 14. The network printer 12 may be automatically configured to be used with all of the target computers at the same time. To connect any one or more of the target computers to the network printer 12, a network printer connection must be established between them. To establish the network printer connection between the network printer 12 and a target computer such as a second network computer 102 requires that there be a communications path between the network printer 12 and the second network computer 102, and that the driver or drivers associated with the network printer 12 be installed on the second network computer 102 and be associated with the communications path.

The network 14, to which both the network printer 12 and the second network computer 102 are operatively coupled, serves as the communications path. The second network computer 102 creates a port, which is typically a virtual port, for each network printer connection that is to be established over the communications path. The network location of the network printer 12 is associated with the port. Further, the driver/drivers associated with the network printer 12 are also associated with the port. Thus, to establish the network printer connection between the target computer (here, the second network computer 102) and the network printer 12, it is necessary for the second network computer 102 to acquire both the driver/drivers associated with the network printer 12 and the network location of the network printer 12.

For the second network computer 102 to acquire the driver/drivers, the driver/drivers must be placed in a location operatively coupled to the network that the second network computer 102 may access. This location may be a share-providing computer that contains a share. The share may be the share created when the proxy computer 104 shares its local printer connection to the shared printer 13 with any of the target computers operatively coupled to the network 14. Of course, this would require that the shared printer 13 and the network printer 12 were the same type of printer. The second network computer 102 needs to know the location of the share-providing computer to obtain information about the driver or drivers and/or the driver/drivers themselves. By associating the location of the share-providing computer with the location of the network printer 12, it is possible to make certain that the driver/drivers acquired according to information learned from the share-providing computer is/are the proper driver/drivers to enable printing to the network printer 12. This configuration information (i.e., the location of the share-providing computer and location of the network printer 12) may be placed in a memory location somewhere on the network 14, such as in a server (not shown) operatively coupled to the network 14. The second network computer 102 is then able to retrieve the configuration information through the network 14. The configuration information may be sent from the server in the form of configuration signals. The configuration information identifies the network location of both the share-providing computer (in this case, the proxy computer 104) and the network printer 12. Of course, the location of the network printer 12 and the proxy computer 104 may both be given in terms of their respective network addresses.

After the second network computer 102 receives the configuration signals, the second network computer 102 may still need to acquire the driver/drivers before establishing a connection to the network printer 12. The second network computer 102 sends a command through the network 14 to the proxy computer 104, whose location the configuration signals specified. Since a share has been established in the proxy computer 104, that computer responds to the command by sending signals back to the second network computer 102. These signals include driver-identification signals, which identify a driver/drivers to the second network computer 102. The identified driver/drivers should be the driver/drivers associated with the network printer 12. The driver-identification signals may include a path to the driver as well as the name/names of the driver/drivers. Of course, the second network computer 102 may already have the driver/drivers identified by the driver-identification signals. The second network computer 102 therefore determines whether it has the identified driver/drivers. If the determination is that the second network computer 102 does not include the driver, the second network computer 102 obtains the driver through the network 14 from, for example but not limited to, the share-providing computer. Finally, the second network computer 102 establishes a network printer connection to the network printer 12, using the location identified by the configuration signals and the driver/drivers identified by the driver-identification signals.

As described above, network printer connections may be automated without the need to manually distribute printer installation software to individual computers. Accordingly the disclosed methods and systems include driver distribution for network printers that may be automated as described above. For this purpose, software on the target computer may call routines, exposed by the target computer's operating system's applications programming interface, for sending the command that results in the return of driver-identification signals from the share-providing computer.

Typically, but not necessarily, a target computer will be provided with programming that is separate from its operating system. This programming may also be to supplement programming that is part of the target computer's operating system, such as but not limited to a group policy system. In according with the programming, whether separate from or supplemental to the target computer's operating system, the target computer may prompt the location containing the configuration information, such as the server, to send the configuration information as described above. This prompting by the target computer may occur on a periodic basis, which may further be specified to be at particular time intervals. According to the programming, the target computer then responds to the receipt of the configuration information by invoking appropriate routines exposed by the target computer's operating system's applications programming interface. Those routines may include the driver distribution routines referred to above, as well as other routines used to establish and configure the connection between the target computer and the network printer. Such routines may be the same routines used to establish and configure shared printer connections.

Alternatively, an API exposed by the operating system of the target computer need not be used. Another set or sets of instructions may be used to retrieve the configuration information, to send the command resulting in the share-providing computer sending the driver-identification signals, and to establish the network printer connection at the target computer. The other set or sets of instructions may also make the determination if the target computer already includes the identified driver and then obtain the identified driver through the network if the determination is negative. Thus, in one embodiment, a target computer system is coupled to the network and is configured to contain and employ such a set of instructions.

Execution of the set of instructions/routines of the API may occur at any time. For example, the set of instructions may execute immediately, or upon distribution by, for example but not limited to, a group policy system. Execution of the set of instructions may also be delayed until a particular triggering event is detected. The triggering event is typically controlled by the network administrator, or any other user who is responsible for having the network printer connections established. The triggering event may be, for example, but is not limited to a logon script that executes on the target computer when a network user logs on to the network 14. The triggering event may also be defined by the group policy system.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single or multiple processor/devices.

The device(s) or computer systems that integrate with the processor(s) may include, for example, a personal computer(s), workstation (e.g., Sun, HP), personal digital assistant (PDA), handheld device such as cellular telephone, laptop, handheld, or another device capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus may be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory or a memory location, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of automatically configuring a target computer on a network to have a connection to a network printer, the method comprising:

receiving through the network, at the target computer from a server, configuration signals having corresponding configuration information of the network printer that identify (i) a share-providing computer on the network, the share-providing computer having a share for a local printer and having a driver for the local printer, and (ii) a network location of the network printer on the network, wherein the configuration information does not include a driver for the network printer;

automatically sending through the network from the target computer a command that results in the share-providing computer automatically sending to the target computer driver-identification signals that identify a driver for the network printer;

determining, at the target computer from the driver-identification signals, whether the target computer includes a driver for the network printer based on the share of the local printer;

in response to said determining indicating that the target computer does not include the driver for the network printer, determining, at the target computer, whether the share-providing computer on the network includes the driver for the network printer:
  when said determining indicates that the share-providing computer includes the driver for the network printer, obtaining, by the target computer, the driver for the network printer from the share-providing computer via the network; and
  when the share-providing computer does not include the driver for the network printer, obtaining, by the target computer, the driver for the network printer from one of the other computers or storages other than a server based on the driver-identification signals from the share-providing computer; and
establishing, at the target computer, a network-printer connection with the network printer, said network printer being at the location identified by the configuration signals and whose driver is the driver identified by the driver-identification signals.

2. The method according to claim 1 wherein the target computer obtains the driver from the share.

3. The method according to claim 1, wherein the configuration signals identify the network location of the network printer in terms of the network printer's network address.

4. The method according to claim 1 wherein the configuration signals that identify the share specify a path to the share.

5. The method according to claim 1 wherein calls to an applications-programming interface provided by the target computer's operating system are employed to send the command and establish the network-printer connection.

6. The method according to claim 1 wherein the driver-identification signals provide the driver's name.

7. A system for automatically configuring a target computer on a network to have a connection to a network printer, said system comprising:
  a network; and
  a share-providing computer, a target computer, a network printer, and a server, all operatively coupled to the network, wherein:
    (a) the share-providing computer provides a share that includes a driver associated with a local printer;
    (b) the server contains configuration information that identifies the share-providing computer and a network location of the network printer, wherein the configuration information does not include a driver for the network printer; and
    (c) the target computer contains a set of instructions that, when executed by the target computer, cause the target computer to:
      (i) retrieve the configuration information corresponding to the network printer from the server,
      (ii) automatically send a command to the network location of the share-providing computer identified by the retrieved configuration information that results in the share-providing computer automatically sending, to the target computer, driver-identification signals that identify the driver for the network printer based on the share with the local printer, and
      (iii) establish at the target computer the network-printer connection with the network printer, said network printer being at the location identified by the configuration information retrieved from the server and the driver-identification signals sent from the share-providing computer, wherein the target computer determines whether the share-providing computer on the network includes the driver for the network printer:
        when said determining indicates that the share-providing computer includes the driver for the network printer, the target computer obtains the driver for the network printer from the share-providing computer via the network to provide to the target computer; and
        when said determining indicates that the share-providing computer does not include the driver for the network printer, the target computer obtains the driver for the network printer from one of the other computers or storages other than the server based on the driver-identification signals sent from the share-providing computer.

8. The system according to claim 7 wherein the set of instructions further includes:
  making a determination of whether the target computer includes the driver identified by the driver-identification signal; and
  obtaining the driver through the network if the determination is that the target computer does not include that driver.

9. The system according to claim 8 wherein the target computer obtains the driver from the share.

10. The system according to claim 8 wherein the set of instructions comprises an applications-programming interface provided by the target computer's operating system.

11. The system according to claim 10 wherein calls to an applications programming interface provided by the target computer's operating system are employed to send the command and establish the network-printer connection.

12. The system according to claim 7 wherein the configuration information identifies the network location of the network printer in terms of the network printer's network address.

13. The system according to claim 7 wherein the configuration information that identifies the share specifies a path to the share.

14. The system according to claim 7, wherein the set of instructions includes routines exposed by an applications-programming interface provided by the target computer's operating system.

15. The system according to claim 7 wherein calls to an applications-programming interface provided by the target computer's operating system are employed to send the command and establish the network-printer connection.

16. The system according to claim 7, wherein the driver-identification signals include signals that provide the driver's name.

17. A target computer system operatively coupled to a network and configured to execute computer-executable components, said components comprising:
  a receiving unit for receiving, through the network and from a server, configuration signals that identify (i) a share-providing computer on the network, the share-providing computer having a driver for a local printer, said share-providing computer providing a share that specifies a driver associated with the local printer, and (ii) a network location of the network printer, said configuration signals having configuration information of the network printer, wherein the configuration information does not include a driver for the network printer, and wherein the target computer lacks a driver for the network printer;

a sending unit for automatically sending, through the network, a command that results in the share-providing computer automatically sending to the target computer driver-identification signals that identify a driver for the network printer based on the share with the local printer, said driver for the network printer not being stored on the server; and an establishing connection unit for establishing, at the target computer, the network printer connection with the driver based on the driver-identification signals from the share-providing computer, said network printer being at the location identified by the configuration signals, wherein the establishing connection unit determines whether the share-providing computer on the network includes the driver for the network printer:

when said determining indicates that the share-providing computer includes the driver for the network printer, the establishing connection unit obtains the driver for the network printer from the share-providing computer via the network to provide to the target computer; and when said determining indicates that the share-providing computer does not include the driver for the network printer, the establishing connection unit obtains the driver from one of the other computers or storages other than the server based on the driver-identification signals from the share-providing computer.

18. The target computer system according to claim 17, wherein the target computer system contains an operating system that exposes application programming interface routines for sending through a network a command that results in the share-providing computer sending the driver identification signals to the target computer and for establishing a network printer connection on the target computer; and the target computer is configured to employ those applications programming interface routines to send the command to the share-providing computer identified by the configuration signals and to establish the network printer connection with the network printer at the location identified by the configurations signals.

19. The target computer system according to claim 18, wherein the target computer system is further configured by programming to: detect a triggering event.

20. The target computer system according to claim 19, wherein the applications programming interface routines are not exposed until after the triggering event is detected.

21. The target computer system according to claim 20, wherein the triggering event is the execution of a logon script at the target computer.

22. The target computer system according to claim 17, wherein the target computer system is further configured by programming to:

make a determination of whether the target computer includes the driver identified by the driver-identification signals; and obtain the driver through the network if the determination is that the target computer does not include that driver.

23. The target computer system according to claim 22, wherein the target computer obtains the driver from the share.

24. The target computer system according to claim 17, wherein the network location of the network printer is a network address.

25. The target computer system according to claim 17, wherein the driver-identification signals include signals that provide the driver's name.

* * * * *